(12) United States Patent
Bixel

(10) Patent No.: US 12,682,876 B2
(45) Date of Patent: Jul. 14, 2026

(54) MULTI-LAYER ACOUSTIC MEDIUM

(71) Applicant: Nut Shell LLC, Redmond, WA (US)

(72) Inventor: Douglas Allan Bixel, Redmond, WA (US)

(73) Assignee: Nut Shell LLC, Redmond, WA (US)

( * ) Notice: Subject to any disclaimer, the term of this patent is extended or adjusted under 35 U.S.C. 154(b) by 474 days.

(21) Appl. No.: 17/646,187

(22) Filed: Dec. 28, 2021

(65) Prior Publication Data

US 2022/0122575 A1 Apr. 21, 2022

Related U.S. Application Data

(63) Continuation of application No. 16/198,431, filed on Nov. 21, 2018, now Pat. No. 11,227,574.

(Continued)

(51) Int. Cl.
B32B 5/02 (2006.01)
B32B 5/12 (2006.01)
(Continued)

(52) U.S. Cl.
CPC ............ G10K 11/168 (2013.01); B32B 5/022 (2013.01); B32B 5/12 (2013.01); B32B 5/266 (2021.05);
(Continued)

(58) Field of Classification Search
CPC .. B32B 5/022; B32B 5/06; B32B 5/08; B32B 5/12; B32B 5/26; B32B 5/265; B32B 5/266; B32B 5/271; B32B 7/12; B32B 21/02; B32B 21/10; B32B 21/13; B32B 37/06; B32B 37/18; B32B 38/1816; B32B 38/1841; B32B 2038/0072; B32B 2250/20; B32B 2260/021; B32B 2260/046; B32B 2262/0223; B32B 2262/0246; B32B 2262/0253; B32B 2262/0261; B32B 2262/0276; B32B 2262/0284; B32B 2262/04; B32B 2262/062; B32B 2262/067; B32B 2262/101; B32B 2262/12; B32B 2262/14; B32B 2262/144; B32B 2305/18; B32B 2305/20; B32B 2305/28;
(Continued)

(56) References Cited

U.S. PATENT DOCUMENTS 2,385,873 A 10/1945 Melton
6,159,882 A * 12/2000 Kean ........................ D04H 1/74
442/403

(Continued)

OTHER PUBLICATIONS

European Search Report dated Jul. 1, 2021 for European patent application No. 18881524.5.

(Continued)

*Primary Examiner* — Michael A Tolin
(74) *Attorney, Agent, or Firm* — Dorsey & Whitney LLP

(57) ABSTRACT

Acoustic mediums are disclosed herein. The acoustic mediums can include a plurality of layers. The layers of the acoustic mediums can include fibrous acoustic materials that are entangled throughout the layer. In certain instances, the layers of the acoustic medium can include first portion of acoustic materials disposed along a first plane, and a second portion of acoustic materials disposed along a second plane. Methods of fabricating multi-layer acoustic mediums are also disclosed.

15 Claims, 2 Drawing Sheets

Related U.S. Application Data

(60) Provisional application No. 62/589,323, filed on Nov. 21, 2017.

(51) Int. Cl.

| | |
|---|---|
| *B32B 5/26* | (2006.01) |
| *B32B 37/06* | (2006.01) |
| *B32B 38/18* | (2006.01) |
| *D04H 1/46* | (2012.01) |
| *D04H 1/74* | (2006.01) |
| *G10K 11/168* | (2006.01) |
| *B32B 37/18* | (2006.01) |
| *B32B 38/00* | (2006.01) |

(52) U.S. Cl.
CPC .......... *B32B 37/06* (2013.01); *B32B 38/1816* (2013.01); *D04H 1/46* (2013.01); *D04H 1/74* (2013.01); *B32B 37/18* (2013.01); *B32B 2038/0072* (2013.01); *B32B 38/1841* (2013.01); *B32B 2250/20* (2013.01); *B32B 2305/18* (2013.01); *B32B 2307/102* (2013.01); *B32B 2310/025* (2013.01)

(58) Field of Classification Search
CPC ........ B32B 2307/102; B32B 2307/732; B32B 2310/025; B32B 2607/00; D01G 25/00; D04H 1/4218; D04H 1/425; D04H 1/4258; D04H 1/4282; D04H 1/4291; D04H 1/4334; D04H 1/435; D04H 1/4374; D04H 1/4382; D04H 1/43825; D04H 1/43828; D04H 1/43835; D04H 1/46; D04H 1/48; D04H 1/485; D04H 1/488; D04H 1/49; D04H 1/492; D04H 1/498; D04H 1/54; D04H 1/541; D04H 1/5412; D04H 1/5418; D04H 1/542; D04H 1/544; D04H 1/55; D04H 1/559; D04H 1/70; D04H 1/74; G10K 11/168
See application file for complete search history.

(56) References Cited

U.S. PATENT DOCUMENTS

| | | |
|---|---|---|
| 2001/0036788 A1 | 11/2001 | Sandoe et al. |
| 2002/0116793 A1 | 8/2002 | Schmidt |
| 2003/0060113 A1 | 3/2003 | Christie et al. |
| 2004/0026249 A1 | 2/2004 | Whatmore et al. |
| 2008/0057283 A1 | 3/2008 | Blinkhorn et al. |
| 2009/0321183 A1 | 12/2009 | Johnson et al. |
| 2010/0081354 A1 | 4/2010 | Shipley et al. |
| 2011/0248117 A1 | 10/2011 | Boock et al. |
| 2014/0182966 A1 | 7/2014 | Fisk et al. |
| 2015/0232044 A1 | 8/2015 | Demo et al. |
| 2015/0252206 A1 | 9/2015 | Kunal et al. |

OTHER PUBLICATIONS

Examination Report dated Feb. 20, 2023 received in European patent application No. 18881524.5.
International Search Report and Written Opinion dated Jan. 28, 2019 for international application No. PCT/US2018/062325.

\* cited by examiner

MULTI-LAYER ACOUSTIC MEDIUM

RELATED APPLICATIONS

This application is a continuation of U.S. application Ser. No. 16/198,431, filed on Nov. 21, 2018 now U.S. Pat. No. 11,227,574 and titled "MULTI-LAYER ACOUSTIC MEDIUM," which claims priority to U.S. Provisional Application No. 62/589,323, filed on Nov. 21, 2017 and titled "MULTI-LAYER ACOUSTIC MEDIUM," each of which is incorporated herein by reference in its entirety.

TECHNICAL FIELD

The present disclosure relates generally to the field of materials for absorbing sound energy. More particularly, some embodiments relate to multi-layer acoustic mediums for absorbing sound energy.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
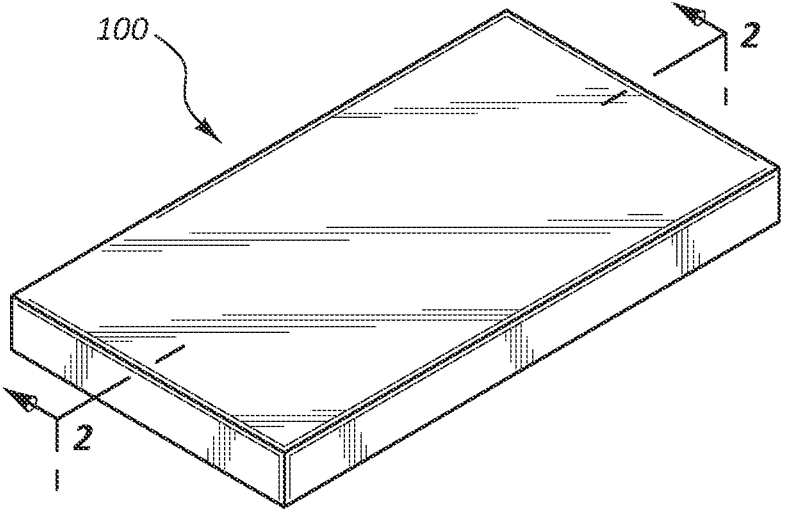
FIG. 1 illustrates a perspective view of an acoustic medium, according to one embodiment.

Many locations are filled with various sources of noise, including people, vehicles, music players, computers, televisions, appliances, musical instruments, etc. These sounds may cause confusions, strain, anxiety, privacy concerns, and/or miscommunication. Accordingly, sound dampening and/or acoustic materials may be used to absorb, dampen, reflect, etc., sound energy in an attempt to control the sound in a desired manner.

The present disclosure relates to acoustic mediums and methods for preparing acoustic mediums for absorbing, dampening, or reflecting sound energy. The embodiments may be best understood by reference to the drawings, wherein like parts are designated by like numerals throughout. It will be readily understood that the components of the present disclosure, as generally described and illustrated in the drawings herein, could be arranged and designed in a wide variety of different configurations. Thus, the following more detailed description of the embodiments is not intended to limit the scope of the disclosure, but is merely representative of possible embodiments of the disclosure. In some cases, well-known structures, materials, or operations are not shown or described in detail. While the various aspects of the embodiments are presented in drawings, the drawings are not necessarily drawn to scale unless specifically indicated.

The terms "first," "second," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The phrase "coupled to" is broad enough to refer to any suitable coupling or other form of interaction between two or more entities, including mechanical and thermal interaction. Two components may be coupled to each other even though they are not in direct contact with each other. The phrase "attached to" refers to interaction between two or more entities which are in direct contact with each other and/or are separated from each other only by a fastener of any suitable variety (e.g., an adhesive). Objects described herein as being "adjacent" to each other may be in physical contact with each other, in close proximity to each other, or in the same general region or area as each other, as appropriate for the context in which the phrase is used.

FIG. 1 illustrates a perspective view of an acoustic medium 100 according to an embodiment of the present disclosure. Acoustic medium 100 may be configured to absorb, dampen, and/or reflect sound energy. Acoustic medium 100 may also be incorporated into a variety of different products for sound absorption. For example, acoustic medium 100 can formed into panels that can be coupled to walls, ceilings, or flooring structures. Acoustic medium 100 may also be incorporated into various types of sound absorption structures, such as those described in U.S. patent application Ser. No. 15/422,308, titled Systems and Methods for Constructing Noise Reducing Surfaces, which is incorporated herein by reference in its entirety.

Acoustic medium 100 can comprise various types of sound dampening materials. Exemplary sound dampening materials that can be used include, but are not limited to, cotton, rayon, acetate, nylon, wood, olefins (or polyolefins), polyesters, acrylics, fiberglass, petroleum based fibers, biofibers (e.g., fibers manufactured from soy bean oil, corn oil, sugar cane, bamboo, etc.) and mixtures thereof. In certain embodiments, acoustic medium 100 comprises polyester and/or fiberglass. In a particular embodiment, acoustic medium 100 comprises polyester. And in another particular embodiment, acoustic medium 100 comprises fiberglass. In certain embodiments, the sound dampening material is fibrous. For example, acoustic medium 100 can comprise fiberglass, a spunbonded olefin, or a spunbonded polyester sound dampening material. In some embodiments, the fibrous material can also be an extruded fibrous material.

The sound dampening material of acoustic medium 100, and/or the layers of acoustic medium 100, can also be nonwoven. Nonwoven materials can be useful in acoustic sound control due to their porous structure, high surface area, and low cost of production. The nonwoven materials may also be porous. For example, nonwoven materials can have a porosity greater than 70%, 80%, or 90%. This porosity can increase the amount of sound energy acoustic medium 100 may absorb.

In some embodiments, acoustic medium 100 comprises mixtures of different types of sound dampening materials (such as mixtures of different types of polyesters). For example, acoustic medium 100 can comprise a high melt material and a low melt material (e.g., such as high and low melt polyesters). High melt materials can refer to materials having a melting point greater than about 330° F., such as between about 330° F. and about 450° F. Low melt materials can refer to materials having a melting point lower than about 320° F., such as between 220° F. and about 320° F. For instance, in a particular embodiment, acoustic medium 100 comprises a mixture of at least one high melt polyester having a melting point greater than about 330° F., such as between about 330° F. and about 450° F., and at least one low melt polyester having a melting point lower than about 320° F., such as between 220° F. and about 320° F. In some of these embodiments, acoustic medium 100 may comprise between about 50% and 95%, or between about 70% and 90% by weight of a high melt material; and between about 5% and 50%, or between about 10% and 30% by weight of a low melt material.

Acoustic medium 100 may also comprise acoustic materials having various weights, thicknesses, or deniers. For example, in certain embodiments, the acoustic materials can comprise a first portion of fibers having a first average denier and a second portion of fibers having a second average denier. In some of such embodiments, the first average denier is smaller than the second average denier. Additional sizes, such as a third average denier, fourth average denier, etc. can also be used.

As previously indicated, acoustic medium 100 may be configured to absorb, dampen, and/or reduce acoustic energy. In some embodiments, acoustic medium 100 may reduce acoustic energy by at least 20%, at least 30%, at least 40%, at least 50%, at least 60%, at least 70%, at least 80%, or at least 90%. In other embodiments, acoustic medium 100 may reduce acoustic energy in an amount ranging from 50% to 90%. The standard for measuring such a reduction of acoustic energy may be a Noise Reduction Coefficient (NRC) as tested under ASTM C423.

As detailed below, acoustic medium 100 can comprise a plurality of layers that are fabricated into a mat. In some of such embodiments, fabrication of the acoustic medium 100 comprises disposing acoustic material into two or more layers. The acoustic material can then be treated. For example, the acoustic material can be compressed and/or subjected to heat or elevated temperatures, such as with a hot iron or heat press to form a mat. Other manufacturing methods and/or processes can also be used. For example, in some embodiments, acoustic materials can be entangled within a layer. Entanglement can occur prior to laying the adjacent layer (e.g., second layer), or after laying the adjacent layer.

Figure 2:
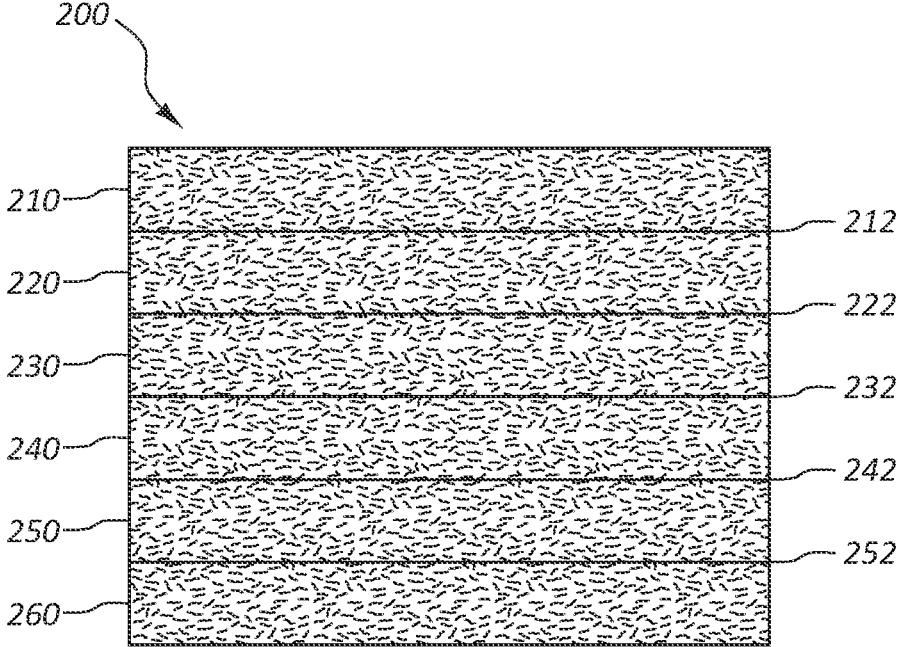
FIG. 2 illustrates a cross-sectional view of an acoustic medium along cross-section line 2-2 of FIG. 1, with a plurality of layers laid using a parallel lay technique, according to another embodiment.
Figure 3:
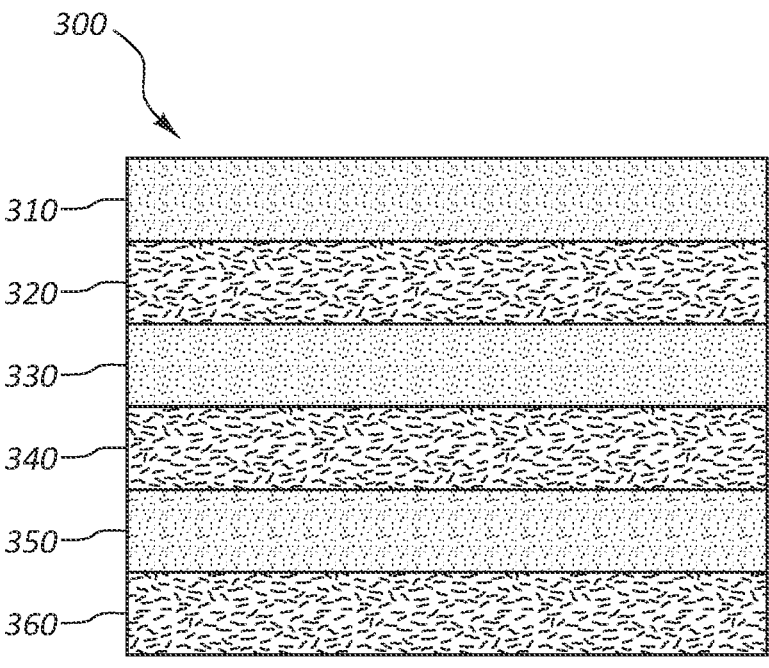
FIG. 3 illustrates a cross-sectional view of an acoustic medium along cross section line 2-2 of FIG. 1, with a plurality of layers laid using a cross lay technique, according to another embodiment.
Figure 4:
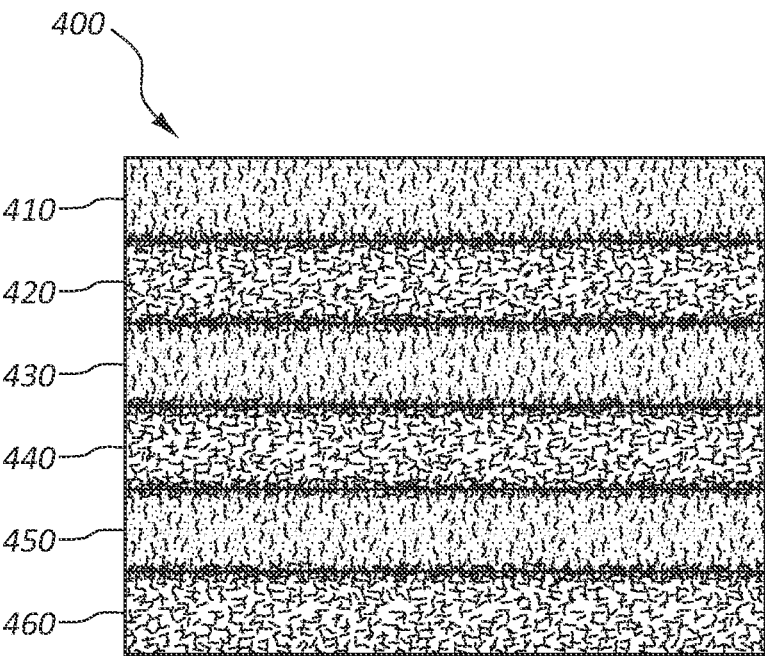
FIG. 4 illustrates a cross-sectional view of an acoustic medium along cross-section line 2-2 of FIG. 1, with a plurality of cross laid layers and additional fiber entanglement, according to another embodiment.

FIGS. 2-4 depict various embodiments of acoustic mediums 200, 300, 400 that can be formed in accordance with principles of the present disclosure. Without limitation, it will be appreciated that FIG. 1 can be representative of a perspective view of any one of FIGS. 2-4. Analogously, FIGS. 2-4 can represent cross-sectional views taken along the view line 2-2 of FIG. 1 in accordance with various embodiments. More specifically, FIG. 2 depicts a cross-sectional view of an acoustic medium 200 comprising layers of parallel laid acoustic materials; FIG. 3 depicts a cross-sectional view of an acoustic medium 300 comprising layers of cross laid acoustic materials; and FIG. 4 depicts a cross-sectional view of an acoustic medium 400 comprising layers of cross laid acoustic materials with additional entanglement of acoustic material.

With reference to FIG. 2, acoustic medium 200 can comprise a plurality of individual layers 210, 220, 230, 240, 250, and 260. Specifically, the illustrated embodiment of FIG. 2 depicts acoustic medium 200 as having six layers. It will be appreciated, however, that acoustic medium 200 may include more or less than six layers as desired. For example, acoustic medium 200 may include as little as two or three layers, or greater than ten, greater than twenty, or greater than thirty layers.

Acoustic medium 200 can also comprise a variety of thicknesses. For example, in some embodiments, acoustic medium 200, when compressed, can comprise a thickness of between about 1 inch and about 3 inches, between about 1.25 inches and about 2.75 inches, between about 1.5 inches and about 2.5 inches, or between about 1.75 inches and about 2.25 inches. Other thicknesses are also contemplated.

In some embodiments, individual layers 210, 220, 230, 240, 250, 260 can be separate from other layers. For example, a first layer 260 may be laid, after which a second 250, third 240, fourth 230, fifth 220, sixth layer 210, etc., can be laid upon the first layer 260. In some of such embodiments, a boundary 212, 222, 232, 242, 252 can separate the individual layers. In particular embodiments, an adhesive, tie, or bonding material can also be disposed between the individual layers to aid in adhering or otherwise bonding the layers 210, 220, 230, 240, 250, 260 together. In other embodiments, individual layers 210, 220, 230, 240, 250, 260 may be bonded to each other using mechanical bonding, chemical bonding, and/or thermal bonding. In still other embodiments, individual layers 210, 220, 230, 240, 250, 260 are disposed directly on one another. And in certain of such embodiments, no additional adhesive, tie, or bonding materials are required.

In some embodiments, each layer 210, 220, 230, 240, 250, 260 comprises the same type of acoustic material. In other embodiments, each layer 210, 220, 230, 240, 250, 260 comprises a different type of acoustic material (or a different mixture thereof). In still other embodiments, some layers 210, 220, 230, 240, 250, 260 comprise the same type of acoustic material, and other layers 210, 220, 230, 240, 250, 260 comprise a different type of acoustic material (or a mixture thereof). Some layers 210, 220, 230, 240, 250, 260 can also comprise different types of acoustic materials within the same layer 210, 220, 230, 240, 250, 260.

The acoustic materials may be disposed and formed into layers 210, 220, 230, 240, 250, 260 in various ways. For example, various dry laying techniques can be used to lay or otherwise disposed the acoustic material into the one or more layers 210, 220, 230, 240, 250, 260. Exemplary techniques that can be used include parallel laying and cross laying techniques. These techniques can enable the individual layers 210, 220, 230, 240, 250, 260 to be prepared and then formed into the acoustic medium 200 or mat.

In some embodiments, the acoustic materials are disposed using a parallel laying technique. Parallel laying techniques refer to laying the acoustic material (e.g., fibrous acoustic material) of the individual layers 210, 220, 230, 240, 250, 260 (which can also be referred to as webs) on top of one another in the same direction (or parallel with one another). For example, the fibers of an acoustic material can be substantially disposed along a first orientation (or direction)

of a first plane to form a first layer (such as layer 260 of FIG. 2). Additional fibers of acoustic material can then be substantially disposed on top of the first layer, along the first orientation (or direction) of the first plane to form a second layer (such as layer 250 of FIG. 2). Additional layers can be similarly applied, such as a third layer, fourth layer, fifth layer, sixth layer, etc. For example, as shown in FIG. 2, the acoustic materials (or at least a majority thereof) have been disposed along the same direction (e.g., horizontal) in each of the layers 210, 220, 230, 240, 250, 260, and can be described as being substantially parallel to one another.

In other embodiments, the acoustic materials are disposed in a non-parallel laying technique, such as a cross laying technique, as is depicted in FIG. 3. Non-parallel laying techniques, such as cross laying techniques, refer to disposing the acoustic material (e.g., fibrous acoustic material) of the individual layers on top of one another in different directions. For example, fibers of acoustic material can be substantially disposed along a first orientation (or direction) of a first plane to form a first layer (such as layer 360 of FIG. 3). Additional fibers of acoustic material (or at least a majority thereof) can then be substantially disposed on top of the first layer along a second direction (that is different than the first direction) to form a second layer (such as layer 350 of FIG. 3). Additional layers can be similarly applied, such as a third layer, fourth layer, fifth layer, sixth layer, etc. In some embodiments, the fibers of acoustic materials alternate in their orientation (or direction) every other layer.

In certain embodiments, the acoustic material of each layer 310, 320, 330, 340, 350, 360 (or at least a majority thereof) is laid at an angle that is at about 90 degrees (or orthogonal) relative to the angle of the acoustic material of each adjacent layer. For instance, the material of layer 320 is laid at an angle that is at about 90 degrees from the angle of material in layers 310 and 330, and so forth. In other embodiments, the acoustic material of each layer 310, 320, 330, 340, 350, 360 is laid at angles other than 90 degrees, or at angles that are not orthogonal to adjacent layers. For example, the orientation of the materials (e.g., fibrous materials) can be disposed at angles that are less than 90 degrees, less than 80 degrees, less than 70 degrees, less than 60 degrees, less than 50 degrees, less than 40 degrees, or less than 30 degrees relative to the angle of the material in an adjacent layer. Similarly, the acoustic materials (e.g., fibrous materials) can also be disposed at angles that are greater than 90 degrees, greater than 100 degrees, greater than 110 degrees, greater than 120 degrees, greater than 130 degrees, greater than 140 degrees, greater than 150 degrees, or greater than 160 degrees relative to the angle of the material in an adjacent layer.

In some embodiments, a portion of the acoustic material (e.g., fibrous acoustic material) is entangled in one or more layers 410, 420, 430, 440, 450, 460 of the acoustic medium 400, such as is depicted in FIG. 4. For example, as shown in FIG. 4, a first portion of the acoustic material in each layer 410, 420, 430, 440, 450, 460 is disposed along a first plane (e.g., a horizontal plane) or a first direction, and a second portion of the acoustic material is disposed along a second plane (e.g., a vertical plane) or a second direction that is different than the first plane or first direction. As can be appreciated, the second portion of acoustic material can be described as being entangled throughout the first portion of acoustic material. Further, while FIG. 4 depicts an acoustic medium 400 having cross laid layers 410, 420, 430, 440, 450, 460 comprising entangled acoustic material, it will also be appreciated that entangled acoustic material can be applied in an acoustic medium 400 comprising parallel laid layers.

Entanglement of acoustic material (e.g., fibrous acoustic material) can provide additional strength and stability to the acoustic medium 400, and/or the individual layers 410, 420, 430, 440, 450, 460 thereof. For example, entangled acoustic materials within a layer (such as layer 410) can aid in keeping the material of the layer together.

Embodiments having entangled acoustic materials can also be described as having acoustic material disposed along at least two different planes or directions. For example, as shown in FIG. 4, in some embodiments, the portion of entangled acoustic material can be disposed at an angle that is substantially orthogonal to the plane at which the first portion of acoustic material is disposed. In other embodiments, the entangled acoustic material is disposed at an angle that is not substantially orthogonal to the plane at which the first portion of acoustic material is disposed. And in embodiments comprising cross laid layers, acoustic material can be disposed along at least three different directions or orientations, such as an x-direction, a y-direction, and a z-direction.

The amount of acoustic material that is entangled, or disposed along a different plane, can vary. For example, in some embodiments, the amount of acoustic material that is entangled within a layer 410, 420, 430, 440, 450, 460 is between about 10% and about 50%, between about 15% and about 40%, or between about 20% and about 35% by weight.

In further embodiments, acoustic material is also entangled and disposed between two or more of the individual layers 410, 420, 430, 440, 450, 460, which can further aid in coupling, holding, or otherwise adhering the individual layers 410, 420, 430, 440, 450, 460 together. For example, entangled acoustic materials can be entangled between the acoustic materials of two adjacent layers (such as layers 410, and 420) thereby aiding in coupling, holding, or otherwise adhering the adjacent layers.

Entangling acoustic materials may be accomplished through a variety of techniques. For example, in some embodiments, an electric field can be used to pull or otherwise align a portion of the acoustic material and create entangled acoustic material within a layer. For example, one or more acoustic materials can be disposed into one or more layers 410, 420, 430, 440, 450, 460. One or more acoustic materials can also be polar, or otherwise magnetically charged such that at least one end (or each end) is polar in nature. For example, in some embodiments, one or more acoustic materials can be configured to have at least one of a relatively positive end or a relatively negative end. In other embodiments, one or more acoustic materials can be configured to have at least one of a relatively positive end and at least one of a relatively negative end. An electric field can then be generated adjacent to the one or more layers 410, 420, 430, 440, 450, 460 (e.g., via an electrically charged roller or bar), which can cause a portion of the acoustic material (e.g., the polar or charged acoustic material) to move, orient, and/or align itself along another plane or direction. Such movement or alignment can also cause the portion of acoustic material to become entangled in the one or more layers 410, 420, 430, 440, 450, 460.

In one illustrative embodiment, two different acoustic materials can be laid into a layer. A first acoustic material be polar or otherwise magnetically charged. For example, the first acoustic material can be configured to have at least one of a relatively positively charged end and/or a relatively negatively charged end. The second acoustic material can be configured such that it is not polar or otherwise charged. As an electric field is generated adjacent the layer, a portion of the first acoustic material can be moved, oriented, and/or aligned along another plane or direction while the second acoustic material is substantially unaffected, resulting in entanglement within the layer.

In other embodiments, entangling acoustic materials may be accomplished mechanically. For example, a portion of the acoustic material can be entangled by punching or otherwise forcing needles or other objects through the acoustic medium 400, or a layer 410, 420, 430, 440, 450, 460 thereof. In other embodiments, entanglement is not accomplished by punching or otherwise forcing needles or other objects through the acoustic medium 400 or a layer 410, 420, 430, 440, 450, 460 thereof. In another embodiment, a portion of the acoustic material can be entangled by sewing materials or fibers into the acoustic medium 400, or a layer 410, 420, 430, 440, 450, 460 thereof. For instance, the entangled fibers can be sewn into their orientation. In yet another embodiment, entangling acoustic materials can be accomplished by forcing gas (e.g., air) through the acoustic medium 400, or a layer 410, 420, 430, 440, 450, 460 thereof (which can cause one or more fibers or materials to change orientation and/or result in entanglement). In yet another embodiment, entangling acoustic materials can be accomplished by forcing one or more entangled materials or fibers into the acoustic medium 400, or a layer 410, 420, 430, 440, 450, 460 thereof, and into an entangled orientation, such as with use of a gas (e.g., air). Entangling acoustic materials can also be accomplished via stirring or mixing various acoustic materials or fibers thereof.

In certain embodiments, entanglement can occur with different deniers of acoustic material. For example, an electric field (or other mechanical method) can be used to move, orient, and/or align portions of the acoustic material based on the denier of the material. For instance, a first portion of acoustic material comprising a first average denier and a second portion of acoustic material comprising a second average denier can be disposed along a first plane or direction. An electrical charge (or other mechanical method) can then be applied to the acoustic material and cause the first portion of acoustic material to move, orient, or align along a different plane or direction, while the second portion of acoustic material remains substantially unaffected.

In another embodiment, a first portion of acoustic material comprising a first average denier can be disposed along a first plane or first direction, and a second portion of acoustic material comprising a second average denier can be pulled, oriented, or otherwise disposed such that the second portion of acoustic material is aligned along a second plane or second direction.

As previously indicated, after the acoustic materials are disposed in one or more layers 410, 420, 430, 440, 450, 460, the acoustic medium 400 can be further subjected to additional processing steps. For example, the acoustic medium 400 can be compressed to decrease the overall depth or width of the acoustic medium 400. In such embodiments, each layer 410, 420, 430, 440, 450, 460 can be compressed towards one another.

The acoustic medium 400 may also be heat treated. For example, the acoustic medium 400 can be subjected to elevated temperatures, such as temperatures between about 220° F. and 450° F. In some embodiments, the acoustic medium 400 is heated with one or more of a flame, a hot iron or press, or by exposure to heated gases. Other manufacturing and/or processing steps can also be employed.

Methods of using and/or fabricating an acoustic medium are also disclosed herein. In particular, it is contemplated that any of the components, principles, and/or embodiments discussed above may be utilized in either an acoustic medium or a method of using and/or fabricating the same. An illustrative method of fabricating an acoustic medium can include a step of disposing a first fibrous acoustic material along a first plane to form a first layer and a step of orienting a first portion of the first fibrous material along a second plane to entangle the first portion of the first fibrous material with another portion of the first fibrous material. The method can also include a step of disposing a second fibrous acoustic material on the first layer to form a second layer. Other method steps are also contemplated.

It will be appreciated that any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

The invention claimed is:

1. An acoustic medium comprising:
a layer of fibrous acoustic material comprising a first portion and a second portion, wherein the first portion comprises fibers that are polar in the fibrous acoustic material of the acoustic medium such that the first portion is electrically oriented and entangled within the second portion, wherein the first portion of the fibrous acoustic material comprises between about 10% and about 40% of fibers in the fibrous acoustic material, wherein the fibers of the first portion are oriented along a first direction and the fibers of the second portion are oriented along a second direction that is not parallel with the first direction.

2. The acoustic medium of claim 1, wherein the fibrous acoustic material comprises at least one of cotton, rayon, acetate, nylon, wood, olefins, polyesters, acrylics, or fiberglass.

3. The acoustic medium of claim 1, wherein the fibrous acoustic material comprises polyester or fiberglass.

4. The acoustic medium of claim 1, wherein the fibrous acoustic material is nonwoven.

5. The acoustic medium of claim 1, wherein the fibrous acoustic material comprises at least one high melt material and at least one low melt material.

6. The acoustic medium of claim 5, wherein the fibrous acoustic material comprises between about 50% and about 95% of high melt material, and between about 5% and about 50% of low melt material.

7. The acoustic medium of claim 1, wherein the fibers of the first portion of the fibrous acoustic material of the acoustic medium include a first region and a second region having a different charge than the first region.

8. The acoustic medium of claim 1, wherein the first portion comprises a first average denier, and the second portion comprises a second average denier that is different than the first average denier.

9. An acoustic medium comprising:
a layer of fibrous acoustic material comprising a first portion and a second portion, wherein the first portion is electrically oriented and entangled within the second portion, wherein the first portion comprises fibers that are polar in the fibrous acoustic material of the acoustic medium, wherein the fibers of the first portion are oriented along a first direction and the fibers of the second portion are oriented along a second direction that is different than the first direction, wherein the first portion comprises a first average denier and the second portion comprises a second average denier that is different than the first average denier.

10. The acoustic medium of claim 9, wherein the fibrous acoustic material comprises at least one of cotton, rayon, acetate, nylon, wood, olefins, polyesters, acrylics, or fiberglass.

11. The acoustic medium of claim 9, wherein the fibrous acoustic material comprises polyester or fiberglass.

12. The acoustic medium of claim 9, wherein the fibrous acoustic material is nonwoven.

13. The acoustic medium of claim 9, wherein the fibrous acoustic material comprises at least one high melt material and at least one low melt material.

14. The acoustic medium of claim 9, wherein the second portion is substantially unaffected by an electrical charge.

15. The acoustic medium of claim 9, wherein the first portion of the fibrous acoustic material comprises between about 10% and about 40% of fibers in the fibrous acoustic material.

* * * * *